United States Patent [19]

Han

[11] Patent Number: 4,825,591
[45] Date of Patent: May 2, 1989

[54] AUTOMATIC WATERING DEVICE FOR PLANTS

[76] Inventor: Joon H. Han, 816 Gregorio Dr., Silver Spring, Md. 20901

[21] Appl. No.: 210,500

[22] Filed: Jun. 23, 1988

[51] Int. Cl.⁴ ............................................. A01G 25/00
[52] U.S. Cl. ............................................. 47/67; 47/79
[58] Field of Search .................. 47/48.5, 67, 79; 248/27.8, 211–213, 220.2; 137/406, 403, 408, 419, 421, 424; 222/58, 79; 141/15

[56] References Cited

U.S. PATENT DOCUMENTS

| | | | |
|---|---|---|---|
| 91,413 | 6/1869 | Burley | 137/406 |
| 1,593,172 | 7/1926 | Heatherington | 137/408 |
| 2,198,309 | 4/1940 | James | 47/79 |
| 2,278,655 | 4/1942 | James | 137/403 |
| 2,336,120 | 12/1943 | Null | 137/403 |
| 4,060,934 | 12/1977 | Skaggs | 47/79 |
| 4,078,625 | 3/1978 | Loeb | 47/67 |
| 4,189,124 | 2/1980 | Faris | 47/67 |
| 4,216,619 | 8/1980 | Espy | 47/67 |
| 4,238,002 | 12/1980 | Hexamer | 47/67 |
| 4,270,696 | 6/1981 | Pointer, Jr. | 47/67 |
| 4,454,831 | 6/1984 | Gallo | 47/67 |
| 4,760,666 | 8/1988 | Han | 47/79 |

FOREIGN PATENT DOCUMENTS

| | | | |
|---|---|---|---|
| 841340 | 1/1939 | France | 47/79 |
| 1070140 | 1/1953 | France | 47/79 |

Primary Examiner—Richard J. Johnson
Assistant Examiner—Charles H. Sam
Attorney, Agent, or Firm—Birch, Stewart, Kolasch & Birch

[57] ABSTRACT

A watering device for plants includes a plant container which is balanced on a vertical moving rod by a spring and a water reservoir tank is operatively associated with the plant container so that as the plant container becomes lighter due to a loss of water, the spring member disposed at the opposite end of the vertical moving rod from the plant container actuates a valve in the water reservoir tank and transfers water from the water reservoir tank to the plant container until a balance is again achieved, and when the balance is reached, the valve in the water tank is again closed.

6 Claims, 3 Drawing Sheets

AUTOMATIC WATERING DEVICE FOR PLANTS

BACKGROUND OF THE INVENTION

The present invention relates to an automatic watering device for plants which are grown in the home or in a greenhouse and more particularly, to an improved automatic watering device responsive to water loss by the plants.

There are many types of automatic plant watering apparatuses which are well known in the prior art which utilize a system which is actuated in response to water loss by the plants. However, these apparatuses suffer from a number of disadvantages such as, for example, requiring complex mechanisms to operate and being difficult to install in that a variety of complex methods are required to assemble them. Several types are provided with an elevated water reservoir with a spring loaded valve therein which is actuated by the loss of weight of water by the plants in a container supported by the spring. Since the springs lose their strength as the temperature increases, plants are frequently overwatered on hot days. In addition, there are several types of apparatuses which utilizes a counter weight member such as is disclosed in U.S. Pat. No. 4,060,934. Such apparatuses, however, are used with a plant container which must be placed on the floor or ground. They cannot be utilized with plant containers which must be hung from a ceiling, a wall or the like.

OBJECTS AND SUMMARY OF THE INVENTION

Accordingly, it is an object of the present invention to provide an improved automatic watering device for plants.

Another object of the present invention is to provide an automatic watering device responsive to water loss by the plants which are grown in the home or in a greenhouse.

Yet another object of the present invention is to provide an automatic watering device for hanging plants, which is structured with a vertical moving rod to which is connected to a spring member and a plant container disposed at an opposite end portion thereof so that the plant container can be automatically watered by sensing the amount of water weight loss in the plant container.

A further object of the present invention is to provide a smart watering device for plants, which is easy to assemble or operate and inexpensive to manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic watering device for plants which comprises a plant container which is balanced on a vertical moving rod by a spring member. A water reservoir tank is operatively associated with the plant container so that as the plant container becomes lighter due to a loss of water, the spring member disposed at the opposite end of the vertical moving rod from the plant container actuates a valve in the water reservoir tank, and transfers water from the water reservoir tank to the plant container until a balance is again achieved. When the balance is reached, the valve in the water tank is again closed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
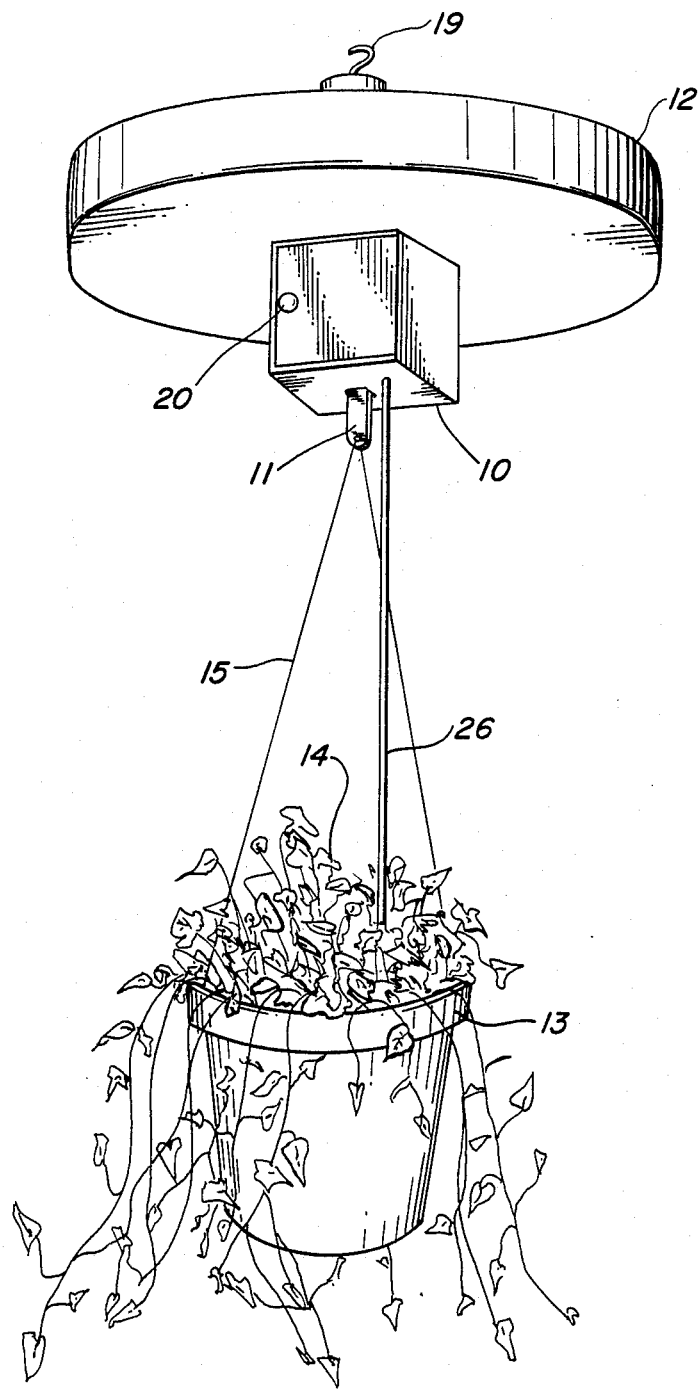
FIG. 1 is a perspective view of the automatic watering device for plants of the present invention.
Figure 2:
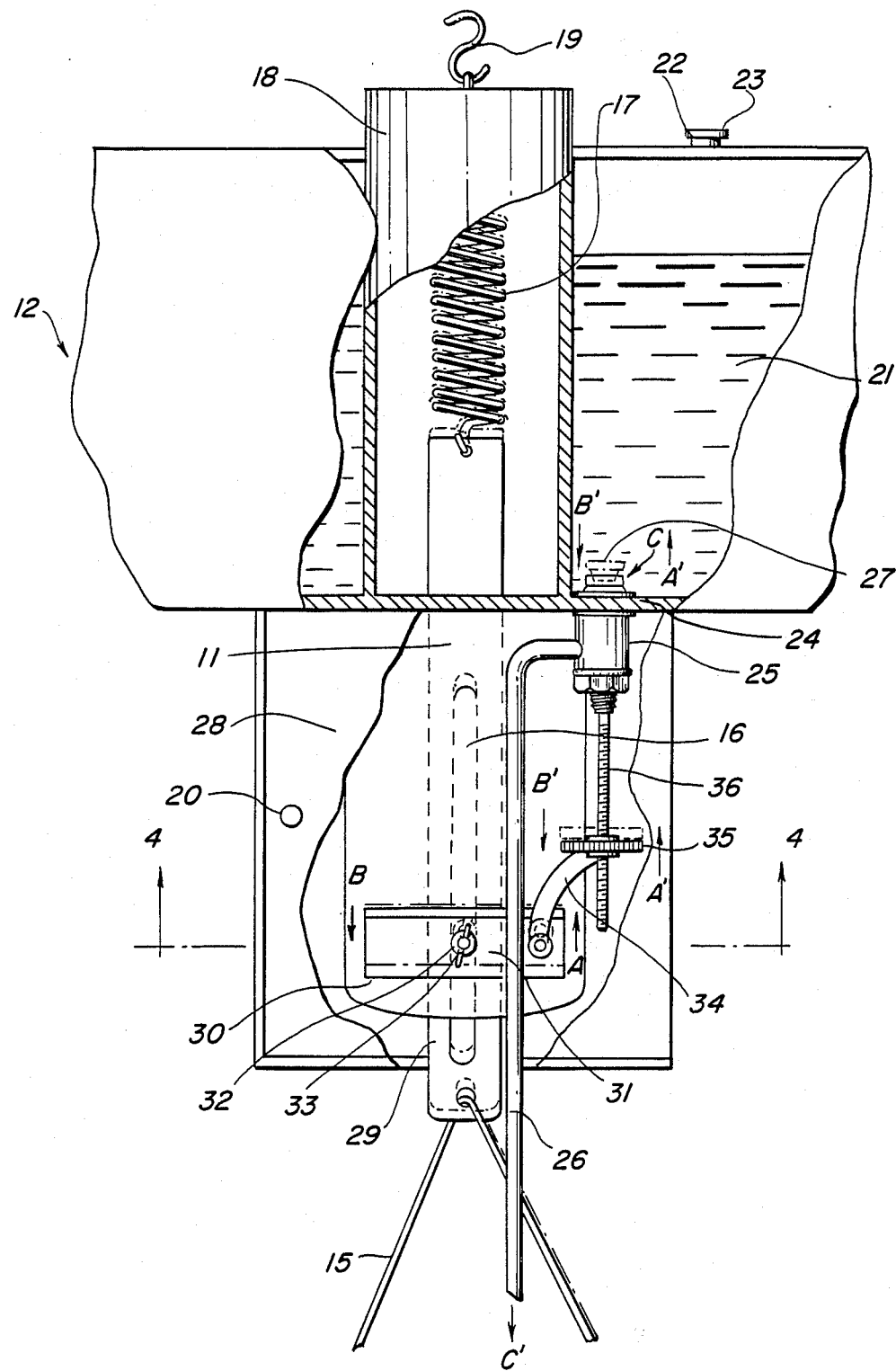
FIG. 2 is a side, partial sectional view of the basic components of the present invention showing the operation thereof.

Referring now in detail to the drawings for the purpose of illustrating the present invention, the automatic watering device for plants as shown in FIGS. 1 and 2 comprises a housing 10 including a vertical moving rod 11, a water reservoir tank 12 disposed on the housing 10 and a plant container 13 for plants 14 hanging from the bottom end of the vertical moving rod 11 by a hanging member 15.

The vertical moving rod 11 includes a elongated slot 16 disposed in the middle portion thereof and is connected to the bottom end of a spring member 17 at the top end thereof and to the plant container 13 at the bottom end thereof. The spring member 17 is disposed within a cylinder 18 which is disposed in the interior of the water reservoir tank 12. The cylinder 18 is provided with a hanger 19 for hanging to a wall or a ceiling for the automatic watering device of the present invention. The housing has a handle 20.

The water reservoir tank 12 is adapted to contain a supply of water 21, and includes a water inlet 22, an opening 23 for communicating with outside air, and a drain hole 24 disposed at the bottom thereof. The drain hole 24 is adapted to receive a cylindrical tube 25 which extends from a drain pipe 26 for draining the water 21 from the water reservoir tank 12 to plants 14 in the plant container 13. The cylindrical tube 25 is provided with a rubber valve 27 attached thereto for mating with the drain hole 24 to open and close the drain hole 24.

Figure 4:
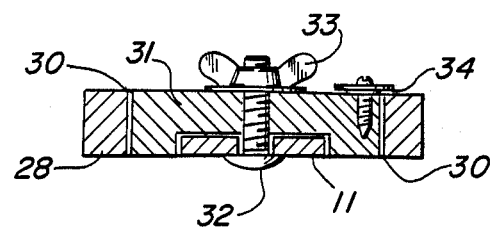
FIG. 4 is a cross-sectional view of FIG. 2 taken along line 4—4.
Figure 3:
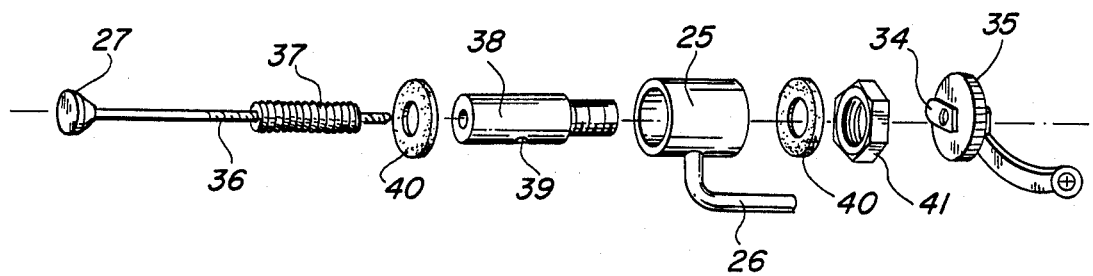
FIG. 3 is an exploded view of a valve member of the automatic watering device of the present invention.

As shown in FIGS. 2, 3 and 4, a supporting plate 28 includes an elongated groove 29 disposed the middle portion thereof for slidably receiving the vertical moving rod 11 to move up and down and a horizontal, rectangular aperture 30 disposed in the lower portion thereof for receiving a movable, rectangular plate 31 (FIG. 4). The movable rectangular plate 31 is fixed to the vertical moving rod 11 by a bolt 32 and an adjusting nut 33 through the elongated slot 16. The movable, rectangular plate 31 is provided with a connecting member 34 for supporting a wheel nut 35 (FIG. 3). The connecting member 34 has U-shaped configuration for receiving the wheel nut 35. The wheel nut 35 mates with a screwed valve rod 36 which connects to a spring 37 disposed within the cylindrical tube 25. The spring 37 is connected to the valve 27 at the one end thereof for biasing against the valve 27 to open. The cylindrical tube 25 includes a tubular body 38 having an aperture 39 for communicating with one end of the drain pipe 26. Also, the tubular body 38 is inserted into the cylindrical tube 25 with rubber packagings 40 and a nut 41. The wheel nut 35 is used for adjusting and closing the valve 27 when the automatic watering device is operated at the first time, if necessary. Also, the adjusting nut 33 is used for adjusting the movable, rectangular plate 31 to the vertical moving rod 11 depending on the balance of the plant container 1 with water at the first time because all plants need a different amount of water for proper growing.

In operation, the water reservoir tank 12 containing water 21 and assembled with a valve system therein is hung from a special area such as a ceiling. Thereafter, the plant container 13 with plants 14 and containing a proper amount of water is hung from the bottom end of the vertical moving rod 11. At this time, the adjusting nut 33 is placed in the appropriate portion of the elongated slot 16 so as to balance the weight of the plant container 23. At this time, the valve 27 is effectively closed by adjusting the wheel nut 35.

As the water is gradually lost from the plant container 13, that is, the weight of the plant container 13 becomes lighter than its original weight, the vertical moving rod 11 moves up in the direction indicated by arrow A, as shown in FIG. 2, due to the biasing force of the spring member 17. The movable plate 31 thus, moves up to push the valve rod 36 in the direction as indicated by arrow A' which opens the rubber valve 27 permitting water 21 to drain from the water reservoir tank 12 to the plant container 13 through the drain pipe 26 in the direction as indicated by arrow C (FIG. 2). As soon as the water 21 is sufficiently supplied to the plant container 13 to balance the plant container 13 against the spring member 17, the rubber valve 27 closes the drain hole member 24 to stop the flow of water 21 to the plant container 13.

Accordingly, the device of the present invention automatically waters the plant container with a predetermined amount of water required for the plant. Thus, there is no need to manually water the plant since the device of the present invention automatically waters the plant until the water is exhausted which usually takes one to two months.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic watering device for plants adapted to suspend from a wall or a ceiling which comprises:
   a plant container,
   a water reservoir tank adapted to contain a supply of water, the water reservoir tank including a cylinder standing on the bottom thereof, said water reservoir tank containing transfer means for conveying water from said water tank said plant container,
   spring means disposed within said cylinder, said spring means being provided with a hanger at the top end thereof for being suspended from the wall or the ceiling,
   a vertical moving rod including a elongated slot disposed in the middle portion thereof, said vertical moving rod connected to the bottom end of said spring means at the top end and to said plant container,
   a supporting plate connected to the bottom of said water reservoir tank, said supporting plate having a rectangular groove disposed in the middle portion thereof for slidably receiving said vertical moving rod and a horizontal, rectangular aperture disposed in the lower portion thereof,
   a rectangular, movable plate, disposed within said horizontal, rectangular aperture, operatively fixed to said vertical moving rod by a bolt and a nut through said elongated slot for adjusting the balance of the plant container with water and moving within said rectangular aperture when the vertical moving rod moves up and down, said rectangular moving plate having a connecting member for associating with an adjusting nut,
   valve means having a screwed rod for mating with an adjusting wheel nut connected to said connecting member, said valve means operatively associated with said transfer means for controlling the conveyance of water from said water reservoir tank to said plant container, and
   whereby, upon the loss of water from the plant container, the vertical moving rod is caused to move up, the rectangular moving plate moves up within the horizontal, rectangular aperture, and the connecting member is caused to push a valve rod up so that the valve means opens to permit water to flow through the transfer means to the plant container until the balance is re-established causing the valve means to close.

2. The automatic watering device of claim 1, wherein the transfer means is an aperture provided in the bottom of the water reservoir tank and conduit means extending from said aperture to the plant container, said valve means being adapted to open and close said aperture depending on the up and down moving balance of the vertical moving rod.

3. The automatic watering device of claim 1, wherein the plant container is provided with a hanging member for hanging to the bottom end of the vertical moving rod.

4. The automatic watering device of claim 1, wherein the spring means is operatively connected to a valve for biasing the valve to close a drain hole disposed in the bottom of the water reservoir tank.

5. The automatic watering device of claim 1, wherein the adjusting wheel nut is screwed along the valve rod for substantially closing the valve when the automatic watering device is operated at the first time.

6. The automatic watering device of claim 4 wherein the drain hole is adapted to receive a drain pipe for draining water form the water reservoir tank to the plant container.

* * * * *